(12) United States Patent
O'Brien, Jr. et al.

(10) Patent No.: US 7,945,064 B2
(45) Date of Patent: May 17, 2011

(54) INTRABODY COMMUNICATION WITH ULTRASOUND

(75) Inventors: William D. O'Brien, Jr., Champaign, IL (US); Albert S. Feng, Champaign, IL (US); Bruce C. Wheeler, Champaign, IL (US); Charissa R. Lansing, Champaign, IL (US); Herbert Bachler, Meilen (CH); Robert C. Bilger, Champaign, IL (US); Carolyn J. Bilger, legal representative, Champaign, IL (US)

(73) Assignee: Board of Trustees of the University of Illinois, Urbana, IL (US)

( * ) Notice: Subject to any disclaimer, the term of this patent is extended or adjusted under 35 U.S.C. 154(b) by 2049 days.

(21) Appl. No.: 10/409,970

(22) Filed: Apr. 9, 2003

(65) Prior Publication Data
US 2004/0202339 A1 Oct. 14, 2004

(51) Int. Cl.
*H04R 25/00* (2006.01)
(52) U.S. Cl. .................. 381/312; 381/315; 455/100
(58) Field of Classification Search .................. 381/312, 381/314–318, 320–323; 455/93, 100, 556.1
See application file for complete search history.

(56) References Cited

U.S. PATENT DOCUMENTS

| | | | |
|---|---|---|---|
| 4,025,721 A | 5/1977 | Graupe et al. |
| 4,207,441 A | 6/1980 | Ricard et al. |
| 4,304,235 A | 12/1981 | Kaufman |
| 4,354,064 A | 10/1982 | Scott |
| 4,559,642 A | 12/1985 | Miyaji et al. |
| 4,611,598 A | 9/1986 | Hortmann et al. |
| 4,703,506 A | 10/1987 | Sakamoto et al. |
| 4,742,548 A | 5/1988 | Sessler et al. |
| 4,752,961 A | 6/1988 | Kahn |
| 4,773,095 A | 9/1988 | Zwicker et al. |
| 4,790,019 A | 12/1988 | Hueber |
| 4,845,755 A | 7/1989 | Busch et al. |
| 4,858,612 A | 8/1989 | Stocklin |
| 4,918,737 A | 4/1990 | Luethi |
| 4,982,434 A | 1/1991 | Lenhardt et al. |
| 4,987,897 A | 1/1991 | Funke |
| 4,988,981 A | 1/1991 | Zimmerman et al. |

(Continued)

FOREIGN PATENT DOCUMENTS
DE 28 23 798 B1 9/1979
(Continued)

OTHER PUBLICATIONS

Otis Lamont Frost III, "An Algorithm for linearly Constrained Adaptive Array Processing", Stanford University, Sanford, CA., (Aug. 1972).

(Continued)

*Primary Examiner* — Suhan Ni
(74) *Attorney, Agent, or Firm* — Krieg DeVault LLP; L. Scott Paynter

(57) ABSTRACT

A hearing system has a first device and a second device. The first device acoustically couples to skin of a user of the hearing system and includes a sensor to detect acoustic signals. The second device includes a hearing stimulator arrangement to stimulate hearing of the user in response to the acoustic signals detected with the first device. The first device and second device are each operable to bidirectionally communicate through an ultrasonic communication link comprising at least a portion of the body of the user.

8 Claims, 12 Drawing Sheets

U.S. PATENT DOCUMENTS

| | | |
|---|---|---|
| 5,012,520 A | 4/1991 | Steeger |
| 5,029,216 A | 7/1991 | Jhabvala et al. |
| 5,040,156 A | 8/1991 | Föller |
| 5,047,994 A | 9/1991 | Lenhardt et al. |
| 5,113,859 A | 5/1992 | Funke |
| 5,245,556 A | 9/1993 | Morgan et al. |
| 5,259,032 A | 11/1993 | Perkins et al. |
| 5,285,499 A | 2/1994 | Shannon et al. |
| 5,289,544 A | 2/1994 | Franklin |
| 5,321,332 A | 6/1994 | Toda |
| 5,325,436 A | 6/1994 | Soli et al. |
| 5,383,164 A | 1/1995 | Sejnowski et al. |
| 5,383,915 A | 1/1995 | Adams |
| 5,400,409 A | 3/1995 | Linhard |
| 5,417,113 A | 5/1995 | Hartley |
| 5,430,690 A | 7/1995 | Abel |
| 5,454,838 A | 10/1995 | Vallana et al. |
| 5,463,694 A | 10/1995 | Bradley et al. |
| 5,473,701 A | 12/1995 | Cezanne et al. |
| 5,479,522 A | 12/1995 | Lindemann et al. |
| 5,485,515 A | 1/1996 | Allen et al. |
| 5,495,534 A | 2/1996 | Inanaga et al. |
| 5,507,781 A | 4/1996 | Kroll et al. |
| 5,511,128 A | 4/1996 | Lindemann |
| 5,627,799 A | 5/1997 | Hoshuyama |
| 5,651,071 A | 7/1997 | Lindemann et al. |
| 5,663,727 A | 9/1997 | Vokac |
| 5,694,474 A | 12/1997 | Ngo et al. |
| 5,706,352 A | 1/1998 | Engebretson et al. |
| 5,721,783 A | 2/1998 | Anderson |
| 5,734,976 A | 3/1998 | Bartschi et al. |
| 5,737,430 A | 4/1998 | Widrow |
| 5,755,748 A | 5/1998 | Borza |
| 5,757,932 A | 5/1998 | Lindemann et al. |
| 5,768,392 A | 6/1998 | Graupe |
| 5,793,875 A | 8/1998 | Lehr et al. |
| 5,814,095 A | 9/1998 | Müller et al. |
| 5,825,898 A | 10/1998 | Marash |
| 5,831,936 A | 11/1998 | Zlotnick et al. |
| 5,833,603 A | 11/1998 | Kovacs et al. |
| 5,878,147 A | 3/1999 | Killion et al. |
| 5,889,870 A | 3/1999 | Norris |
| 5,991,419 A | 11/1999 | Brander |
| 6,002,776 A | 12/1999 | Bhadkamkar et al. |
| 6,010,532 A | 1/2000 | Kroll et al. |
| 6,023,514 A | 2/2000 | Strandberg |
| 6,068,589 A | 5/2000 | Neukermans |
| 6,094,150 A | 7/2000 | Ohnishi et al. |
| 6,104,822 A | 8/2000 | Melanson et al. |
| 6,118,882 A | 9/2000 | Haynes |
| 6,137,889 A | 10/2000 | Shennib et al. |
| 6,141,591 A | 10/2000 | Lenarz et al. |
| 6,154,552 A | 11/2000 | Koroljow et al. |
| 6,160,757 A | 12/2000 | Täger et al. |
| 6,161,046 A | 12/2000 | Maniglia et al. |
| 6,167,312 A | 12/2000 | Goedeke |
| 6,173,062 B1 | 1/2001 | Dibachi et al. |
| 6,182,018 B1 | 1/2001 | Tran et al. |
| 6,192,134 B1 | 2/2001 | White et al. |
| 6,198,693 B1 | 3/2001 | Marash |
| 6,198,971 B1 | 3/2001 | Leysieffer |
| 6,217,508 B1 | 4/2001 | Ball et al. |
| 6,222,927 B1 | 4/2001 | Feng et al. |
| 6,223,018 B1 | 4/2001 | Fukumoto et al. |
| 6,229,900 B1 | 5/2001 | Leenen |
| 6,243,471 B1 | 6/2001 | Brandstein et al. |
| 6,251,062 B1 | 6/2001 | Leysieffer |
| 6,261,224 B1 | 7/2001 | Adams et al. |
| 6,272,229 B1 | 8/2001 | Baekgaard |
| 6,283,915 B1 | 9/2001 | Aceti et al. |
| 6,307,945 B1 | 10/2001 | Hall |
| 6,317,703 B1 | 11/2001 | Linsker |
| 6,334,072 B1 | 12/2001 | Leysieffer |
| 6,342,035 B1 | 1/2002 | Kroll et al. |
| 6,363,139 B1 | 3/2002 | Zurek et al. |
| 6,380,896 B1 | 4/2002 | Berger et al. |
| 6,389,142 B1 * | 5/2002 | Hagen et al. ............ 381/313 |
| 6,390,971 B1 | 5/2002 | Adams et al. |
| 6,754,472 B1 * | 6/2004 | Williams et al. ......... 455/100 |
| 6,861,944 B1 * | 3/2005 | Hoepelman .............. 340/5.1 |
| 2001/0049466 A1 | 12/2001 | Leysieffer et al. |
| 2001/0051776 A1 | 12/2001 | Lenhardt |
| 2002/0012438 A1 | 1/2002 | Leysieffer et al. |
| 2002/0019668 A1 | 2/2002 | Stockert et al. |
| 2002/0029070 A1 | 3/2002 | Leysieffer et al. |

FOREIGN PATENT DOCUMENTS

| | | |
|---|---|---|
| DE | 33 22 108 A1 | 12/1984 |
| DE | 195 41 648 C2 | 10/2000 |
| DE | 100 40 660 A1 | 2/2001 |
| EP | 0 824 889 A1 | 2/1998 |
| EP | 0 802 699 A2 | 10/1998 |
| WO | WO 98/26629 | 6/1998 |
| WO | WO 98/56459 | 12/1998 |
| WO | WO 00/30404 | 5/2000 |
| WO | WO 01/06851 A1 | 2/2001 |
| WO | WO 01/87011 A2 | 11/2001 |
| WO | WO 01/87014 A2 | 11/2001 |

OTHER PUBLICATIONS

Stadler and Rabinowitz "On the Potential of Fixed Arrays for Hearing Aids", J. Scoust. Soc, Am 94 (3), Pt. 1, (Sep. 1993).

Soede, Berkhout, Bilsen "Development of a Directional Hearing Instrument Based on Array Technology", J. Acoust. Soc, Am. 94 (2), Pt. 1, (Aug. 1993).

M. Bodden "Auditory Demonstrations of a Cocktail-Party-Processor" Acta Acustica vol. 82, (1996).

Whitmal, Rutledge and Cohen "Reducing Correlated Noise in Digital Hearing Aids" IEEE Engineering in Medicine and Biology (Sep./Oct. 1996).

D. Banks "Localisation and Separation of Simultaneous Voices with Two Microphones" IEE (1993).

Bodden "Modeling Human Sound-Source Localization and the Cocktail-Party-Effect" Acta Acustica, vol. 1, (Feb./Apr. 1993).

Griffiths, Jim "An Alternative Approach to Linearly Constrained Adaptive Beamforming" IEEE Transactions on Antennas and Propagation, vol. AP-30, No. 1, (Jan. 1982).

Lindemann "Extension of a Binaural Cross-Correlation Model by Contralateral Inhibition. I. Simulation of Lateralization for Stationary Signals" J. Acous. Soc. Am. 80 (6), (Dec. 1996).

Link, Buckley "Prewhitening for Intelligibility Gain in Hearing Aid Arrays" J. Acous. Soc. Am. 93 (4), Pt. 1, (Apr. 1993).

Hoffman, Trine, Buckley, Van Tasell, "Robust Adaptive Microphone Array Processing for Hearing Aids: Realistic Speech Enhancement" J. Acoust. Soc. Am. 96 (2), Pt. 1, (Aug. 1994).

Peissig, Kollmeier "Directivity of Binaural Noise Reduction in Spatial Multiple Noise-Source Arrangements for Normal and Impaired Listeners" J. Acoust. Soc. Am. 101 (3) (Mar. 1997).

Capon "High-Resolution Frequency-Wavenumber Spectrum Analysis" Proceedings of the IEEE, vol. 57, No. 8 (Aug. 1969).

Kollmeier, Peissig, Hohmann "Real-Time Multiband Dynamic Compression and Noise Reduction for Binaural Hearing Aids" Journal of Rehabilitation Research and Development, vol. 30, No. 1, (1993) pp. 82-94.

McDonough "Application of the Maximum-Likelihood Method and the Maximum-Entropy Method to Array Processing" Topics in Applied Physics, vol. 34.

T.G. Zimmerman, "Personal Area Networks: Near-field intrabody communication", (1996).

Liu, Wheeler, O'Brien, Bilger, Lansing, Feng "Localization of Multiple Sound Sources with Two Microphones", J. Accoustical Society of America 108 (4), Oct. 2000.

* cited by examiner

INTRABODY COMMUNICATION WITH ULTRASOUND

CROSS-REFERENCE TO RELATED APPLICATIONS

The present application is related to International Patent Application Number PCT/US01/15047 filed on May 10, 2001; International Patent Application Number PCT/US01/14945 filed on May 9, 2001; U.S. patent application Ser. No. 09/805,233 filed on Mar. 13, 2001; U.S. patent application Ser. No. 09/568,435 filed on May 10, 2000; U.S. patent application Ser. No. 09/568,430 filed on May 10, 2000; International Patent Application Number PCT/US99/26965 filed on Nov. 16, 1999; and U.S. Pat. No. 6,222,927 B1; all of which are hereby incorporated by reference.

BACKGROUND OF THE INVENTION

The present invention relates to communications, and more particularly, but not exclusively, relates to communication with ultrasound transcutaneously transmitted between devices carried on or implanted in the human body.

Various approaches have been suggested to communicate between electronic devices carried on a person's body. Of particular interest is the communication between components of a hearing aid system. Such systems frequently include a signal processor, one or more microphone units, and/or hearing stimulus units spaced apart form one another relative to a user's body. U.S. patent application Ser. No. 09/805,233 filed on Mar. 13, 2001; Ser. No. 09/568,435 filed on May 10, 2000, and Ser. No. 09/568,430 filed on May 10, 2000; and U.S. Pat. No. 6,222,927 B1 are cited as further sources concerning various hearing systems.

Interconnecting body-carried components for hearing systems and other applications by wires or cables to facilitate electrical or optical communication between the components is generally undesirable. Indeed, wireless Radio Frequency (RF) communications through the atmosphere have been suggested to address this shortcoming. However, communication through the transmission of electromagnetic signals in this manner also has certain drawbacks, such as the potential for interference by stray signals, the difficulty of incorporating the necessary transmission and reception circuits into a device of a size that can be comfortably worn by the user, undesirable power consumption, and/or a high degree of signal attenuation. Accordingly, there is an ongoing demand for further contributions in this area of technology.

SUMMARY OF THE INVENTION

One embodiment of the present invention includes a unique communication system. Other embodiments include unique methods, systems, devices, and apparatus for intrabody communication utilizing ultrasound. As used herein, "sound" and "sonic" refer to an acoustic wave or waves with a frequency less than or equal to 20,000 Hertz (Hz), and "ultrasound" and "ultrasonic" refer to an acoustic wave or waves with a frequency greater than 20,000 Hz.

A further embodiment includes at least two system units operable to be placed on the body of a user. These units each include an ultrasonic transmitter/receiver arrangement. This arrangement includes one or more ultrasonic transducers. These transducers are effective to acoustically couple to skin of the user's body to provide bidirectional point-to-point communication between the units with information-containing ultrasonic signals. In one form, the units are arranged to provide a hearing system with at least one of the units being operatively arranged to stimulate hearing of the user.

Still another embodiment of the present invention includes a hearing system that has an external module arranged to be carried on the body of a user and an implantable module to be at least partially implanted in the body of the user. The external module includes at least one microphone to detect sound and a transmitter to send ultrasonic signals containing information representative of detected acoustic signals when the external module is acoustically coupled to the user's skin. The implantable module includes a receiver and a hearing stimulation arrangement. The receiver receives the ultrasonic signals along an ultrasonic communication link through at least a portion of the body of the user between the external module and the implantable module when the implantable module is at least partially implanted in the body of the user. The hearing stimulation arrangement is responsive to the ultrasonic signals received by the receiver to stimulate hearing of the user in correspondence to the detected sound.

Yet a further embodiment includes a hearing system with an implantable module at least partially implantable in a user's body and at least one external module selected from the group consisting of a programming unit, a remote control, a microphone, and a signal processing device. The implantable module also includes at least one microphone to detect sound, an audio signal processor, and a hearing stimulation arrangement to stimulate hearing in response to the sound detected with the microphone. The external module includes a transmitter for sending information in the form of ultrasonic signals to the implantable module via a transcutaneous ultrasonic communication link through at least a portion of the user's body between the external module and the implantable module. The transmitter is effective to modulate the ultrasonic signals with a carrier frequency in a range between 100 kiloHertz (kHz) and 10 MegaHertz (MHz). The implantable module receives the ultrasonic signals and selectively adjusts operation in response thereto.

A still further embodiment includes: providing a communication system carried by a user's body that includes a first device and a second device; acoustically coupling the first device to a first skin region of the user's body and the second device to a second skin region of the user's body; and bidirectionally communicating between the first and second devices by transmitting ultrasound through at least a portion of the user's body between the first device and the second device.

Yet a further embodiment includes: providing a communication system carried by a user's body, the system including a first device with a sound sensor and a second device; detecting sound with the sensor; generating an ultrasound signal representative of the sound with the first device; and transmitting the ultrasound signal through at least a portion of the user's body from the first device to the second device.

In another embodiment, a hearing system is provided including a first device spaced apart from a second device. The first and second devices are coupled to a user's body with at least one of the first device and second device being acoustically coupled to skin. Two-way communication is performed between the first and second devices through bidirectional transmission of ultrasound signals through at least a portion of the user's body between the first device and second device.

Another embodiment includes: providing a hearing system including a first device spaced apart from a second device; acoustically coupling the first device and the second to a user's body; and performing two-way communication between the first device and the second device through bidirectional transmission of ultrasound signals through at least a portion of the user's body between the first device and the second device. In one form, the ultrasound signals are provided with a carrier frequency in a range between 100 kHz and 10 MHz.

In another embodiment, a hearing system is provided including a first device and second device that are coupled to a user's body in a spaced-apart relationship. An information-carrying ultrasound signal is transmitted from the first device to the second device over a path along a distance of which at least one-half is through non-bony, soft tissue of the user's body. The ultrasound signal is received with the second device and an output is generated based on information determined at least in part from the ultrasound signal.

Further forms, embodiments, objects, features, aspects, benefits, and advantages of the present invention shall become apparent from the detailed drawings and descriptions provided herein.

BRIEF DESCRIPTION OF THE DRAWINGS

In the following figures, like reference numerals represent like features. In some cases, the figures or selected features thereof are not drawn to scale to enhance clarity.

DESCRIPTION OF SELECTED EMBODIMENTS

Figure 1:
FIG. 1 is a diagrammatic view of an intrabody communication system of a first type as worn by a user.
Figure 2:
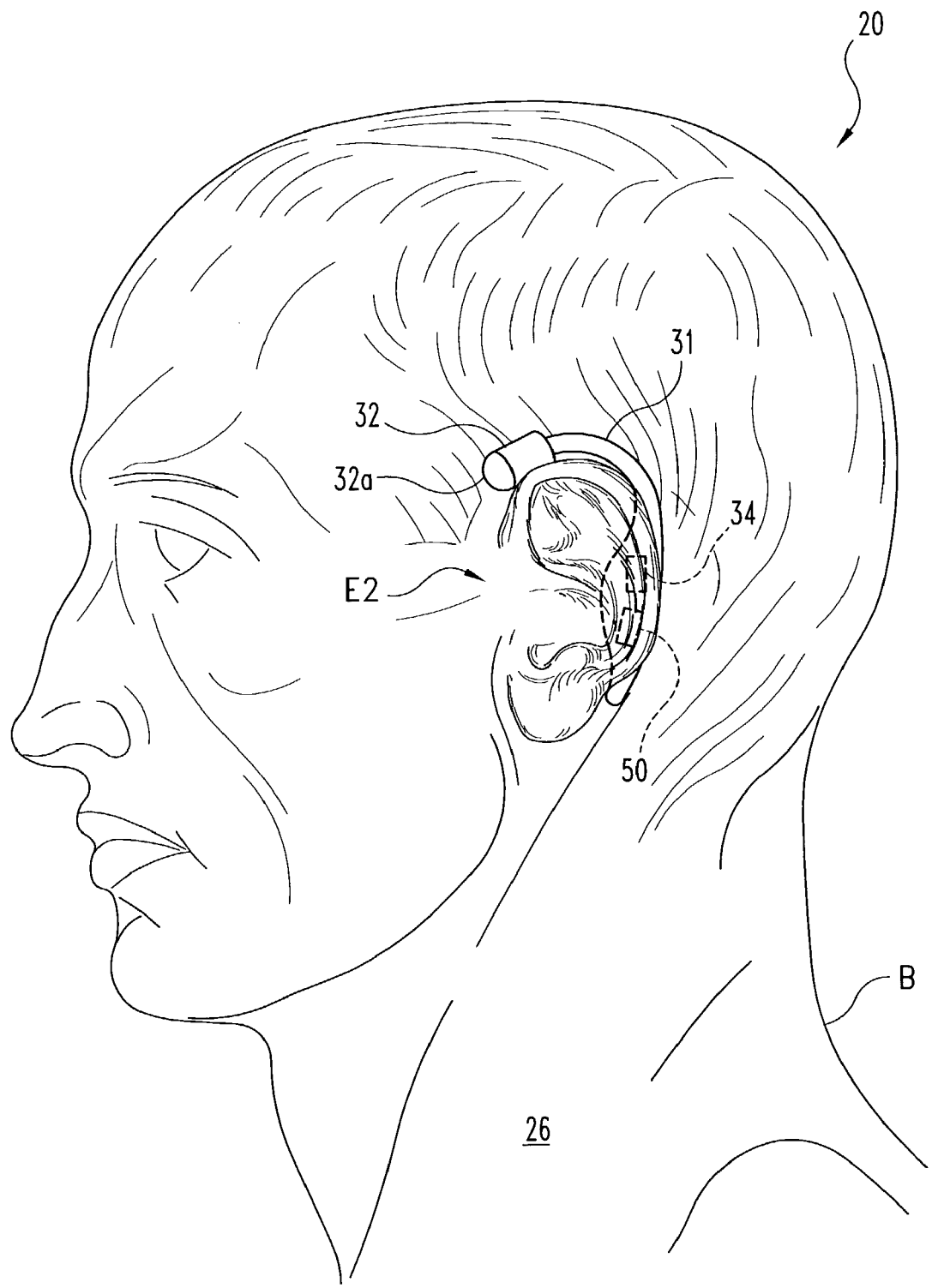
FIG. 2 is a side view of a portion of the system of FIG. 1.

While the present invention may be embodied in many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

One embodiment of the present invention is directed to an intrabody communication system that utilizes ultrasound. In one form, this system is utilized to provide a body area network to communicate between various body-worn devices, such as a headset with one or more earphones and/or one or more microphones, a Personal Digital Assistant (PDA), a mobile phone, and the like. In another form, this system is utilized to communicate between components of a hearing system arrangement, such as that depicted in FIGS. 1-4.

Referring to FIGS. 1-4, intrabody communication system 20 is in the form of a hearing system 21 with hearing system units 30a, 30b, 30c, and 30d (collectively designated modules 30). System 20 communicates operational information between modules 30 by utilizing at least a portion of body B of the user as an ultrasonic transmission line. Hearing system units 30a, 30b, and 30c are external to body B while unit 30d is of an implantable type shown internal to body B (see, for example, FIG. 1 and FIG. 3). External hearing system units 30a and 30b are each in the form of a Behind-The-Ear (BTE) device 31 with respect to ears E1 and E2 of body B. Devices 31 each include sound sensor 32 in the form of a microphone 32a. Microphone 32a can be of an omnidirectional type, or of a directional type such as those with a cardioid, hypercardioid, or FIG. 8 directional pattern to name just a few. Devices 31 also each include a signal processing arrangement 34 coupled to sensor 32 to receive signals therefrom (see, for example FIGS. 2 and 4). In one form, signal processing arrangement 34 includes circuitry to receive electrical signals from sensor 32 representative of detected sound. For this form, signal processing arrangement 34 further includes circuitry to condition, filter, and/or amplify the received signals; and as appropriate, convert the received signals into a desired format—such as conversion from an analog-to-digital format. Signal processing arrangement 34 can include one or more digital signal processors responsive to the received electric signals in a digital format and/or control signals to modify its operation. Electrical power for device 31 can be provided in the form of an electrochemical cell or battery and/or a different source as would occur to those skilled in the art.

Figure 6:
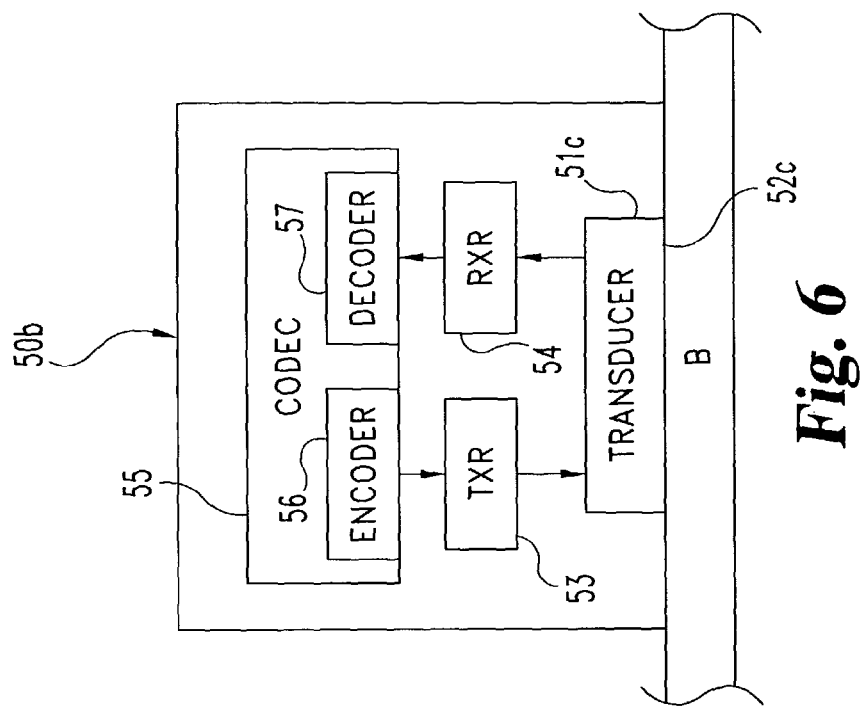
FIGS. 5 and 6 are schematic views of alternative transmitter/receiver arrangements for the ultrasonic transceiver included in the hearing system devices of FIG. 4.
Figure 5:
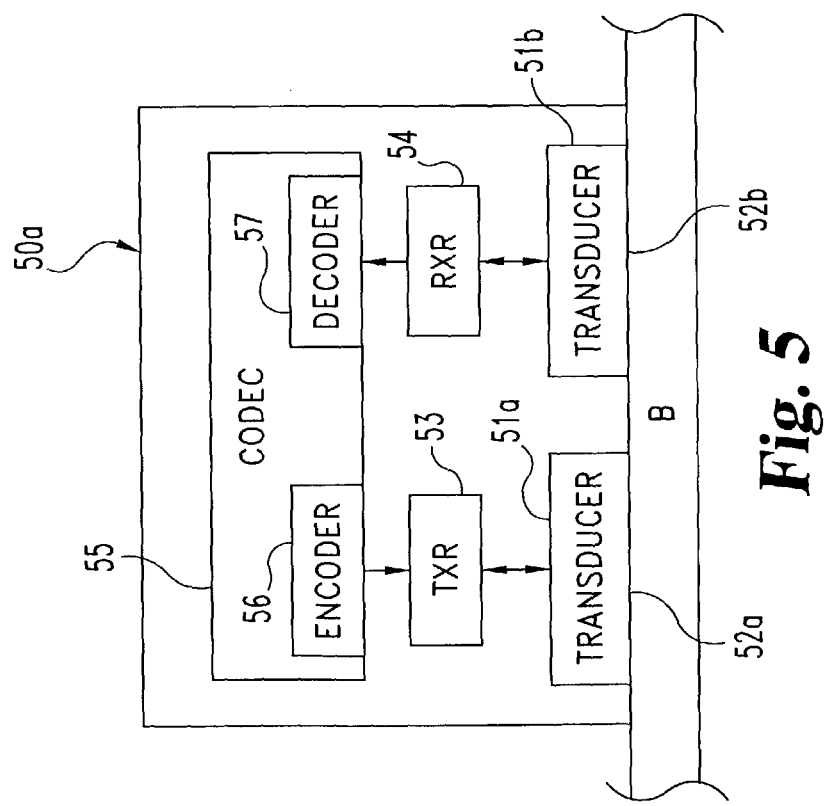

Devices 31 each also include ultrasonic transceiver 50 in contact with skin 26 of body B. As used herein, "transceiver" refers broadly to any device having a capability to transmit and receive information. Referring to FIGS. 5 and 6, two alternative transmitter/receiver arrangements 50a and 50b for ultrasonic transceiver 50 are illustrated. Transmitter/receiver arrangement 50a includes ultrasonic transducers 51a and 51b each having a respective transducer face 52a and 52b arranged to be acoustically coupled to body B. To that end, face 52a, 52b is comprised of at least a portion of an outer surface of an enclosure that houses arrangement 50a and/or is acoustically coupled to such outer surface. For external applications, coupling to body B can be through direct contact of transducer face 52a, 52b with skin 26 of body B; where transducer face 52a, 52b is shaped and sized with respect to the coupling area of body B to reduce air gap formation between face 52a, 52b and body B so that an unacceptable level of ultrasonic signal attenuation does not occur. Additionally or alternatively, a conformal interface material, such as an adhesive, a gel, a liquid, or other type of material could be used to provide a desired acoustic coupling. For subcutaneous applications, transducer acoustic coupling can be directly to bone, cartilage, or such other tissue as would occur to those skilled in the art. An adhesive or other mounting technique to hold the transducer in a desired position and contact relationship could be utilized to implement such subcutaneous applications.

Transducers 51a and 51b are coupled to transmitter (TXR) 53 and receiver (RXR) 54, respectively. Transmitter 53 and receiver 54 are coupled to codec 55. Codec 55 includes encoder 56 and decoder 57. Codec 55 is arranged to communicate externally with signal processing devices such as signal processing arrangement 34 of device 31. Typically, such communications are in a digital format; however, other formats could be additionally or alternatively utilized.

Codec 55 receives information-containing signals from an external source, such as signal processing arrangement 34, and encodes these signals into a desired transmission format with encoder 56. By way of nonlimiting example for digitally encoded formats, an Amplitude Shift Keying (ASK), a Frequency Shift Keying (FSK), a Phase Shift Keying (PSK), a Pulse Width Modulation (PWM), or a Pulse Amplitude Modulation (PAM) technique could be utilized, just to name a few. An encoded signal is provided from codec 55 to transmitter 53 for conversion to a modulated electronic output. Transmitter 53 includes a drive amplifier to provide an output signal of a desired level and impedance. This modulated signal output from transmitter 53 is operable to stimulate transducer 51a to generate a corresponding modulated ultrasonic signal that can be transmitted via face 52a through body B.

Transducer 51b is arranged to generate an electrical output signal in response to detection of a suitably configured ultrasound signal received via face 52b from body B. This electrical output signal from transducer 52b is received by receiver 54 for demodulation. Receiver 54 includes a sense amplifier to assist in such operations. The corresponding demodulated signal output by receiver 54 is provided in an electronic format to codec 55. Decoder 57 of codec 55 decodes the signal from receiver 54, as appropriate for its expected format. Codec 55 then provides a signal externally for use by external signal processing equipment, such as signal processing arrangement 34. For transmitter/receiver arrangement 50a, transducers 51a and 51b can be dedicated to transmitter 53 and receiver 54, respectively; however, in other arrangements, one or more ultrasonic transducers can be utilized for both transmitter and receiver operations.

For example, transmitter/receiver arrangement 50b of FIG. 6 includes transducer 51c with face 52c. Face 52c is arranged to comprise at least a portion of an outer surface of an enclosure for arrangement 50b and/or is acoustically coupled to such surface. Face 52c can be acoustically coupled to body B as described in connection with faces 52a, 52b of transmitter/receiver arrangement 50a. Transducer 51c is coupled to transmitter 53 and receiver 54, which operate in a manner previously described in connection with like reference numerals of FIG. 5. Typically, transducer 51c is time-shared on a periodic or aperiodic basis between an ultrasound signal transmit mode and an ultrasound signal receive mode, correspondingly utilizing transmitter 53 and receiver 50 of arrangement 50b. In one embodiment of arrangement 50b, transmit and receive modes are time-multiplexed in a predefined manner. In other embodiments, changes between receive and transmit modes may be upon demand or be performed in accordance with such other techniques as would occur to those skilled in the art. In still other embodiments, different carrier frequencies and/or modulation techniques can be utilized; such that ultrasonic signals can be transmitted and received with a single transducer in a virtually simultaneous fashion without unacceptable levels of interference between the modes.

While transmitter 53, receiver 54, codec 55, encoder 56, and decoder 57 have been shown as separate operational components to enhance understanding, it should be appreciated that some or all of these operations could be provided by common circuitry and/or components. In one such form, a custom signal processing integrated circuit device can be provided to perform many, if not all, of these operations with little, if any, support circuitry.

Returning to FIGS. 1-4, system 20 also includes unit 30c that provides user control in off-body communication in the form of a signal processing and control device 40. Device 40 is worn by the user with a wrist strap or wrist band 41. Indeed, device 40 can be integrated into a wristwatch or made to appear as one. The WATCHPILOT provided by PHONAK AG, which has a business address of Laubisrütistrasse 28, 8712 Stäfa, Switzerland, could be adapted to such use. Device 40 includes user control 42 arranged to provide input through one or more push buttons, rotary dials, switches, or the like. Device 40 also includes indicator 43 to provide user-observable output. Indicator 43 is typically in the form of a Liquid Crystal Display (LCD) or Light Emitting Diode (LED) display, but can be differently configured as would occur to those skilled in the art.

Device 40 also includes off-body communication interface 45. Interface 45 includes a wireless off-body Radio Frequency (RF) transmitter (TXR) 45a and receiver (RXR) 45b, which collectively provide RF transceiver 45c. Transceiver 45c is coupled to antenna 46. Interface 45 is configured to wirelessly and bidirectionally communicate with off-body device 90 via antenna 92 of device 90. In one form, this RF communication is performed in accordance with a BLUETOOTH or AUTOCOM standard, and/or a MICROLINK or MLX standard from PHONAK AG. Alternatively or additionally, off-body interface 45 can be arranged for communication by an electrically wired connection and/or optical fiber connection provided with appropriate cabling to off-body device 90. In still other embodiments, ultrasonic transmission through the air and/or infrared (IR) communication techniques could be used in addition or as an alternative.

Device 40 further includes signal processing arrangement 44 coupled to control 42, indicator 43, and interface 45. In one form, signal processing arrangement 44 includes electrical circuitry to receive and process user inputs from control 42 and generate information for output via indicator 43. Further, signal processing arrangement 44 includes circuitry to communicate via interface 45. Device 40 also includes ultrasonic transceiver 50. Signal processing arrangement 44 is operatively coupled to ultrasonic transceiver 50. Transceiver 50 is in contact with skin 26 of the user's body B, and can include one of the arrangements 50a or 50b previously described in connection with FIGS. 5 and 6, respectively; or be of such different arrangement as would occur to those skilled in the art. In one nonlimiting form, signal processing arrangement 44 includes one or more processors with programming to facilitate Input and/or Output (I/O) via control 42, indicator 43, interface 45, transceiver 50, and perform any desired data modifications, conversions, storage, or the like; and includes any signal conditioners, filters, format converters (such as analog-to-digital and/or digital-to-analog types), amplifiers, power sources, or the like to implement desired operations as would occur to those skilled in the art.

Figure 3:
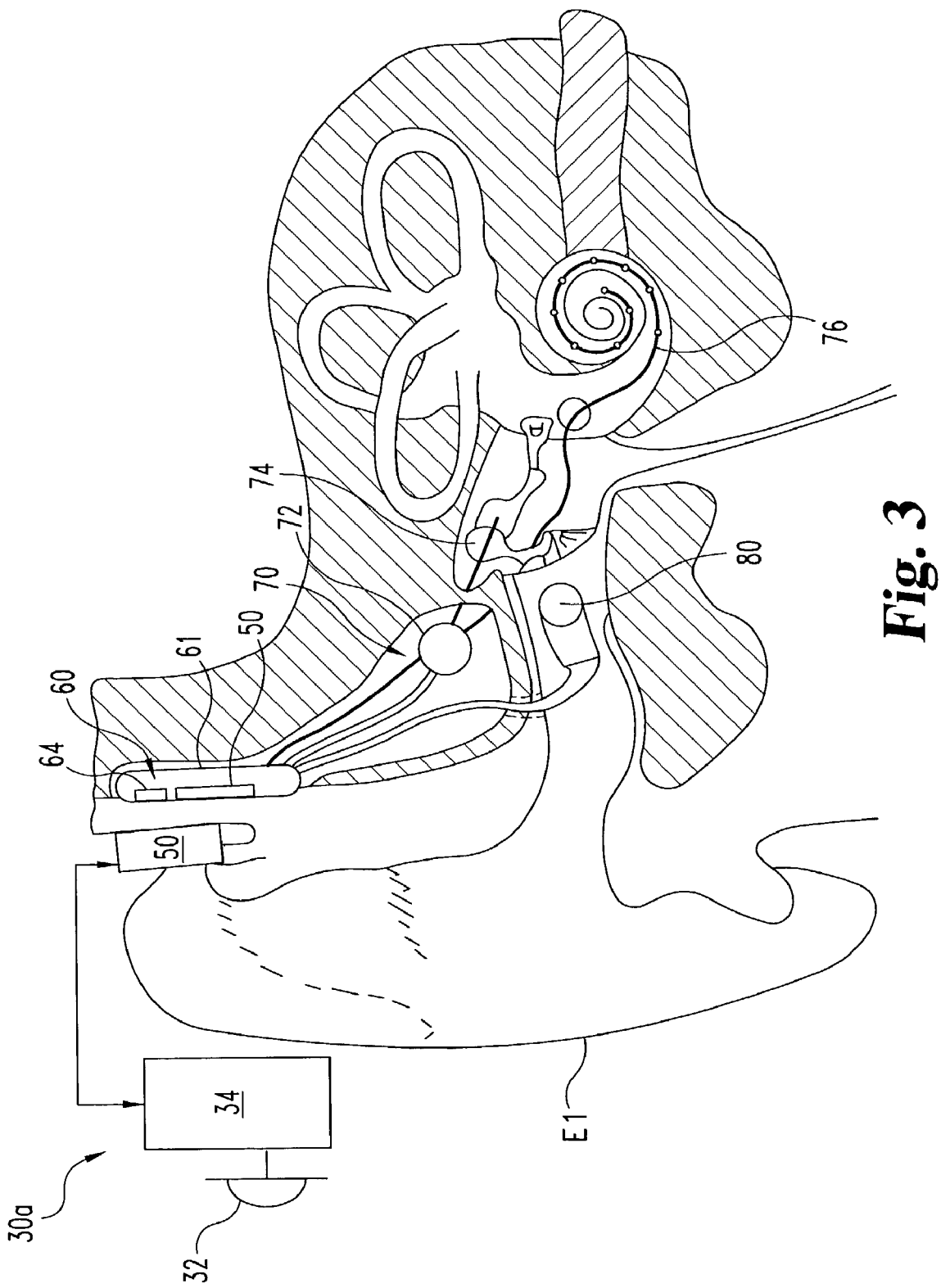
FIG. 3 is a diagrammatic cross-sectional view of a portion of the system of FIG. 1 relative to structures of the user's ear.
Figure 4:
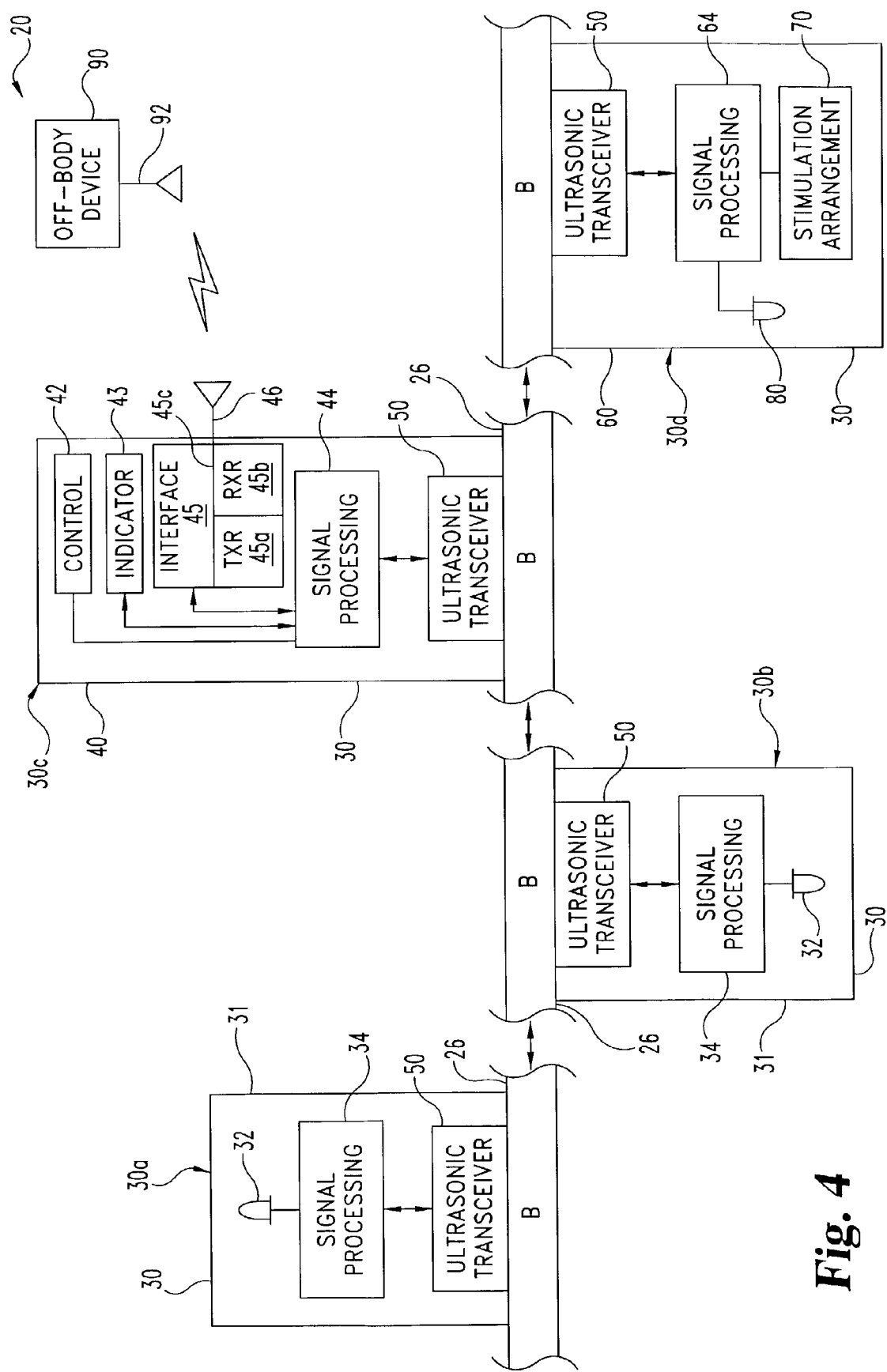
FIG. 4 is a schematic view of various hearing system devices utilized in the system of FIG. 1.

Hearing system unit 30d is illustrated as being implanted within body B in the vicinity of structures associated with ear E1. Hearing system unit 30d includes implanted hearing device 60 which includes ultrasonic transceiver 50 previously described in connection with device 31 and device 40. Referring specifically to FIGS. 3 and 4, device 60 includes signal processing arrangement 64 operatively coupled to ultrasonic transceiver 50, both of which are encapsulated in the enclosure 61. Enclosure 61 is implanted in the mastoid region of ear E1. In one form, enclosure 61 is made from titanium, a ceramic material, or such other body-compatible material as would occur to those skilled in the art.

Device 60 also includes hearing stimulation arrangement 70 coupled to signal processing arrangement 64 via one or more wires or cables from enclosure 61. Hearing stimulation arrangement 70 includes middle ear actuator 72 coupled to the middle ear region in the vicinity of the auditory canal. Hearing stimulation apparatus 70 also includes an electromechanical intracochlear actuator 74, such as a bone conduction cochlear stimulator coupled to the small bones of the ear (malleus, incus, and/or stapes), and intracochlear stimulation electrodes 76 implanted within the cochlea. However, it should be understood that more or fewer hearing stimulation apparatus, or perhaps only one of these hearing stimulators could be used in other embodiments. Device 60 further includes auditory canal microphone 80 coupled to signal processing arrangement 64 via cabling. Microphone 80 can be used to detect acoustic signals in addition to or in lieu of sensors 32 to enhance natural sound perception of the user.

Referring to FIGS. 1-6, certain operational aspects of system 20 for aiding hearing of the user are next described. Modules 30 are arranged to bidirectionally communicate using at least a portion of body B between communicating units 30a, 30b, 30c and 30d as an ultrasonic communication link; or stated differently, as an ultrasonic transmission line. Such two-way ultrasonic communication is represented by the double-headed arrows in FIG. 4 between symbolically illustrated portions of body B in contact with ultrasonic transceivers 50 of modules 30. Accordingly, a Body Area Network (BAN) is implemented with system 20.

In one mode of operation, devices 31 are each mounted to the pinna of a respective ear E1 or E2, providing a spaced-apart sensor relationship for detecting sound. Inputs from spaced-apart sensors 32 can be processed to provide a corresponding hearing stimulus to the user via device 60. Such processing could be performed with the signal processing arrangement of one or more of modules 30, optionally utilizing ultrasonic communication capabilities to transmit information between modules 30 to perform remote or distributed processing with the signal processing arrangements, as required. In one form, at least some processing tasks are distributed among two or more processing units to perform pipelined and/or parallel processing operations. Collectively, system 20 can be arranged to perform adaptive beamforming and/or binaural processing routines for a hearing aid as described, for example, in International Patent Applications Nos. PCT/US01/15047, PCT/US01/14945, or PCT/US99/26965; U.S. patent application Ser. Nos. 09/805,233, 09/568,435, or 09/568,430; and/or U.S. Pat. No. 6,222,927 B1. Alternatively or additionally, other processing techniques can be used to provide a desired type of hearing stimulus.

In such implementations, device 40 can be used to provide the user means for remotely controlling selected aspects of system performance, such as hearing system volume, sound filtering, sensitivity, a sound detection beamwidth or direction, and the like through control 42. Indicator 43 can be used to provide the user selected visual output regarding system user settings and/or one or more other performance parameters, such as battery/power status of one or more modules 30, and the like.

Off-body interface 45 can be arranged to receive information from off-body device 90. Such information can include remote audio input to the user from a Public Address System (PAS), telephonic communication link, one or more remote microphones, an entertainment source such as a radio, television, MP3 player, tape player, CD player, etc. and/or a different type of audio satellite, just to name a few. Alternatively or additionally, off-body device 90 can provide data and/or parametric values used in the operation of system 20. Interface 45 can also be used in conjunction with device 90 to perform testing of one or more modules 30 and/or of system 20 collectively; communicate system or module diagnosis; and/or system/module performance data. Further, where applicable, off-body 90 and interface 45 can be used to add or modify software utilized by any of modules 30. For any information communicated via interface 45, it should be understood that ultrasonic communication can be used to transmit/receive information with respect to modules 30 other than module 30c. In addition or as an alternative, interface 45 can communicate through another wireless technique and/or by cable connection.

It should be understood that point-to-point ultrasonic communication between external hearing system units 30a, 30b, and 30c from one to the next corresponds to a skin-to-skin ultrasonic transmission. In contrast, point-to-point ultrasonic communication with unit 30d occurs transcutaneously with one or more of units 30a, 30b and 30c. For example, as illustrated in FIG. 3, ultrasonic transceiver 50 of unit 30a is arranged to be in close proximity to ultrasonic transceiver 50 of unit 30d to facilitate bidirectional communications therebetween. Likewise, one-way or two-way ultrasound-conveyed information can be directly communicated between unit 30d and one more of units 30b and 30c; and/or can be communicated via unit 30a. Indeed, in alternative embodiments one or more of units 30a, 30b, 30c, and/or 30d may include only the capability to transmit or only the capability to receive ultrasonic signals as desired for the particular arrangement.

It has been surprisingly found that ultrasound communications based on a frequency selected from a range between 100 kHz and 10 MHz can be used to communicate through the human body at a relatively high bandwidth without undesirable levels of attenuation in soft tissue. Accordingly, when such performance is desired, a preferred ultrasound carrier frequency is selected from the range between 100 kHz and 10 MHz. In a more preferred embodiment, an ultrasonic carrier frequency range of about 500 MHz to about 2 MHz is utilized. In terms of digitally encoded information, a bandwidth from about 300 kilobits/second (kb/s) through about 500 kb/s can be utilized for an ultrasound carrier having a frequency in this range. For either the 100 kHz-10 MHz or 500 kHz-2 MHz range, it has been found that higher frequency-transmissions are typically more effective for shorter communication paths through body B, and lower frequency transmissions are typically more effective for relatively longer communication paths through body B. With respect to system 20, one nonlimiting example of a relatively shorter communication path is between units 30a and 30d; and one nonlimiting example of a relatively longer communication path is between units 30a and 30c. Nonetheless, in other embodiments, the communication frequency may be determined independent of the transmission distance through body B, may be uniform regardless of distance, or may be differently determined as would occur to those skilled in the art.

In one embodiment, an ultrasound carrier is used to communicate information along a path having a distance at least half of which is through nonbony, soft tissue. For instance, communication between unit 30c and 30d can take place directly along a path through soft tissue in the cranium of the user. In one alternative embodiment, some or all of the components and/or corresponding functionality of unit 30c are included in one or both units 30a, 30b; and unit 30c is not present. In relation to system 20, this alternative can provide a basis for a relatively greater number of communications through soft tissue of the user's head. In still another alternative embodiment, unit 30c and unit 30a or 30b are not present. For this alternative, the remaining unit 30a or 30b can include some or all of the components and/or corresponding functionality of the one or more units not present.

In one experimental example, ultrasonic signals with a carrier frequency in the 500 kHz to 2 MHz range were transmitted from one mastoid to the other of a human subject with an attenuation of no more than about 20 deciBels (dB). At least one half of the distance traveled by this communication was through soft, non-bony tissue of the human subject's head. Compared to standard RF body area transmission techniques, the level of attenuation of ultrasonically communicated signals in the 500 kHz-2 MHz range according to the present invention can be several orders of magnitude better. Further, for this ultrasonic communication approach, power consumption on the order of about one milliWatt (mW) is made possible compared to at least ten times that for typical RF techniques. Also, a bandwidth of at least 300 kbits/second can be provided with an ultrasonic carrier frequency in the 1-2 MHz range.

Figure 7:
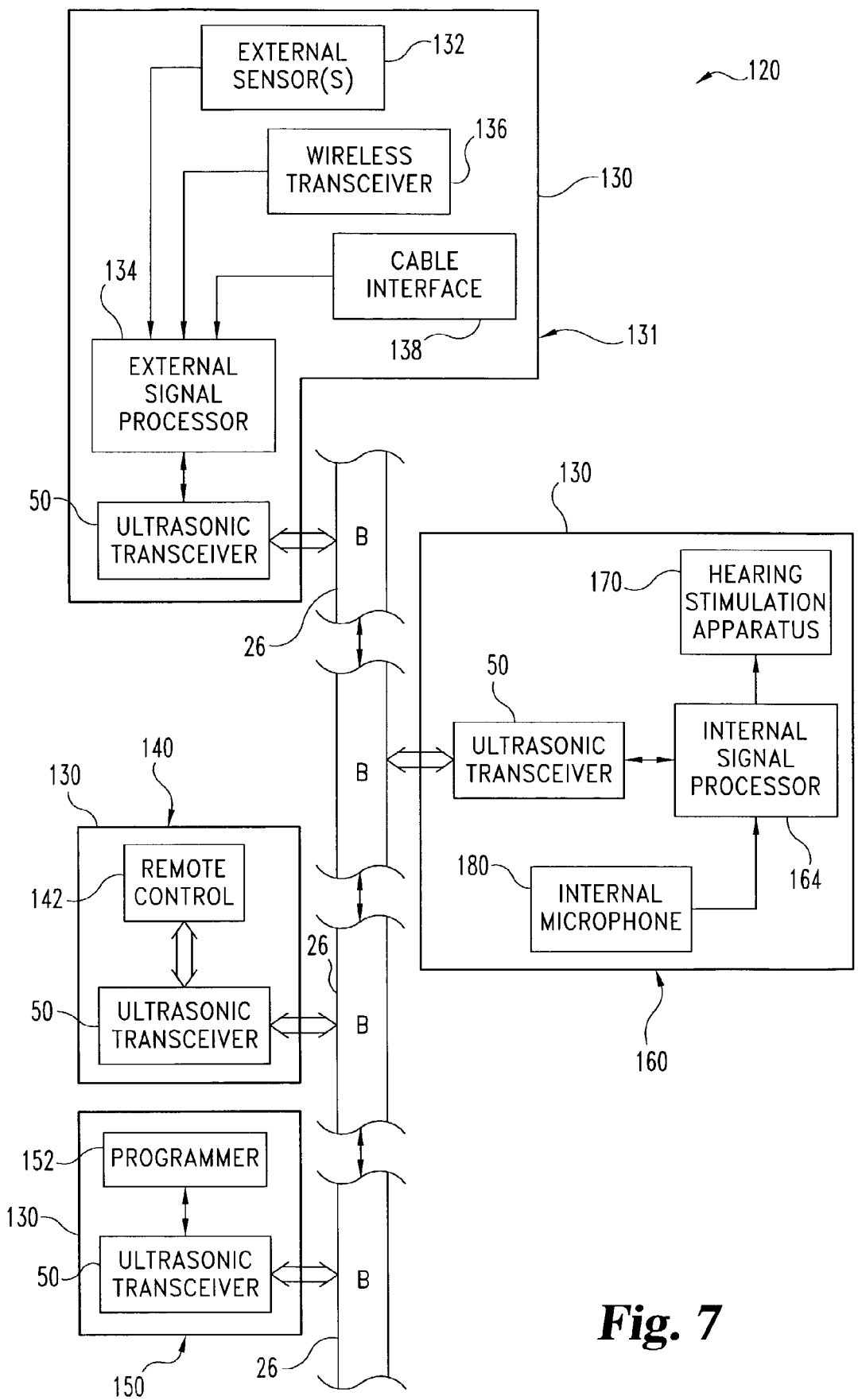
FIG. 7 is a schematic view of an intrabody communication system of a second type.

FIG. 7 illustrates intrabody communication system 120 of another embodiment of the present invention; where like reference numerals refer to like features. System 120 includes a number of hearing system units 130 more specifically designated external processing device 131, external remote control device 140, external programming device 150, and internal hearing device 160. Device 160 is at least partially implantable in body B of a user of system 120. Each hearing system unit 130 includes an ultrasonic transceiver 50 of the type previously described to communicate among units 130 utilizing at least a portion of body B as an ultrasonic signal communication link. Such communications can be bidirectional in nature as symbolized by the double-headed arrows between portions of body B presented in FIG. 7.

Device 131 includes an external signal processor 134 operatively coupled to communicate with other units 130 through ultrasonic transceiver 50 of device 131. Signal processor 134 is operatively coupled to one or more external sensors 132 arranged to detect sound. Sensors 132 can be in the form of a microphone 32a previously described, but can alternatively or additionally be provided as a different type of sound or acoustic detector. Device 131 also includes wireless transceiver 136 which is coupled to signal processor 134. Wireless transceiver 136 operates through a standard RF communication technique to transmit to and/or receive information from a remote source, as described in connection with interface 45 and device 90. Device 131 also includes cable interface/connection 138 to receive/transmit information in an electrical and/or optical format via cabling. Such information can include some or all of the type described in connection with interface 45 and device 90 of system 20. Device 131 can be in the form of one or more Behind-The-Ear (BTE) devices, In-The-Canal (ITC) of the ear devices, or otherwise worn on body B with acoustic coupling to skin 26 of body B as previously described in connection with system 20.

Device 140 provides remote control 142 coupled to ultrasonic transceiver 50. Remote control 142 can be operated by a user and/or service provider to adjust operation of one or more aspects of system 120. In one form, device 140 is of a portable type that is temporarily placed in contact with skin 26 of body B to perform its operations. In other embodiments, device 140 is body-worn with a wrist band, a device appearing as jewelry, a BTE device, an ITC device, or the like. Device 140 can be arranged to receive confirmation of changes in settings or other transmission to any of units 130 from device 140. In other embodiments, device 140 can be arranged to provide for one-way communication—transmitting to other units 130 only.

Device 150 includes system programmer 152 operatively coupled to ultrasonic transceiver 50 of device 150. Collectively, programmer 152 and the coupled ultrasonic transceiver 50 of device 150 communicate via ultrasonic signals through a portion of body B to add to or modify programming associated with one or more of the other units 130. Device 150 can be of a portable type that is temporarily placed in contact with skin 26 of body B by a user or service provider only to perform programming changes as needed, or can be a more permanent body-worn type implemented with a wrist band, a device appearing as jewelry, a BTE device, an ITC device, or the like. Likewise, device 150 can be of a "transmit only" type or a two-way communication type regarding ultrasonic transmissions with other units 130. In alternative embodiments, at least two of devices 131, 140, and 150 are combined in a single unit (not shown).

Device 160 can be of a type comparable to device 60 of system 20. Device 160 includes internal signal processor 164. Internal signal processor 164 is coupled to ultrasonic transceiver 50 of device 160 to selectively provide for communication therewith. Processor 164 is also coupled to hearing stimulation apparatus 170 of device 160. Hearing stimulation apparatus 170 can include one or more of the hearing stimulators of arrangement 70 and/or one or more different hearing stimulator types. Device 160 also includes internal microphone 180 that can be of a subcutaneous type or located in the auditory canal. Collectively, units 130 can operate to perform standard signal processing to enhance hearing of a user of system 120 in the manner previously described in connection with system 20.

Figure 8:
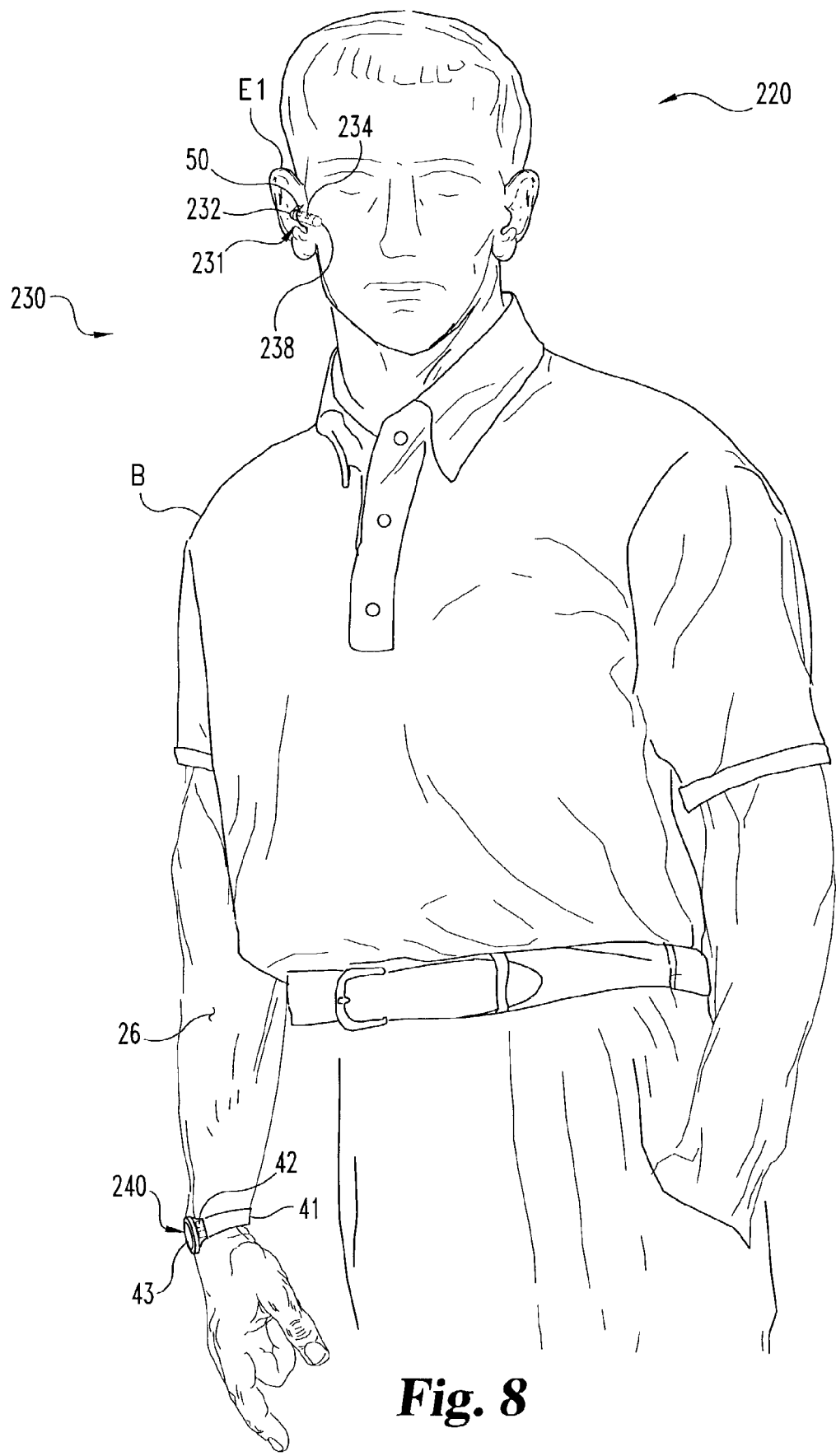
FIG. 8 is a diagrammatic view of an intrabody communication system of a third type as worn by a user.
Figure 9:
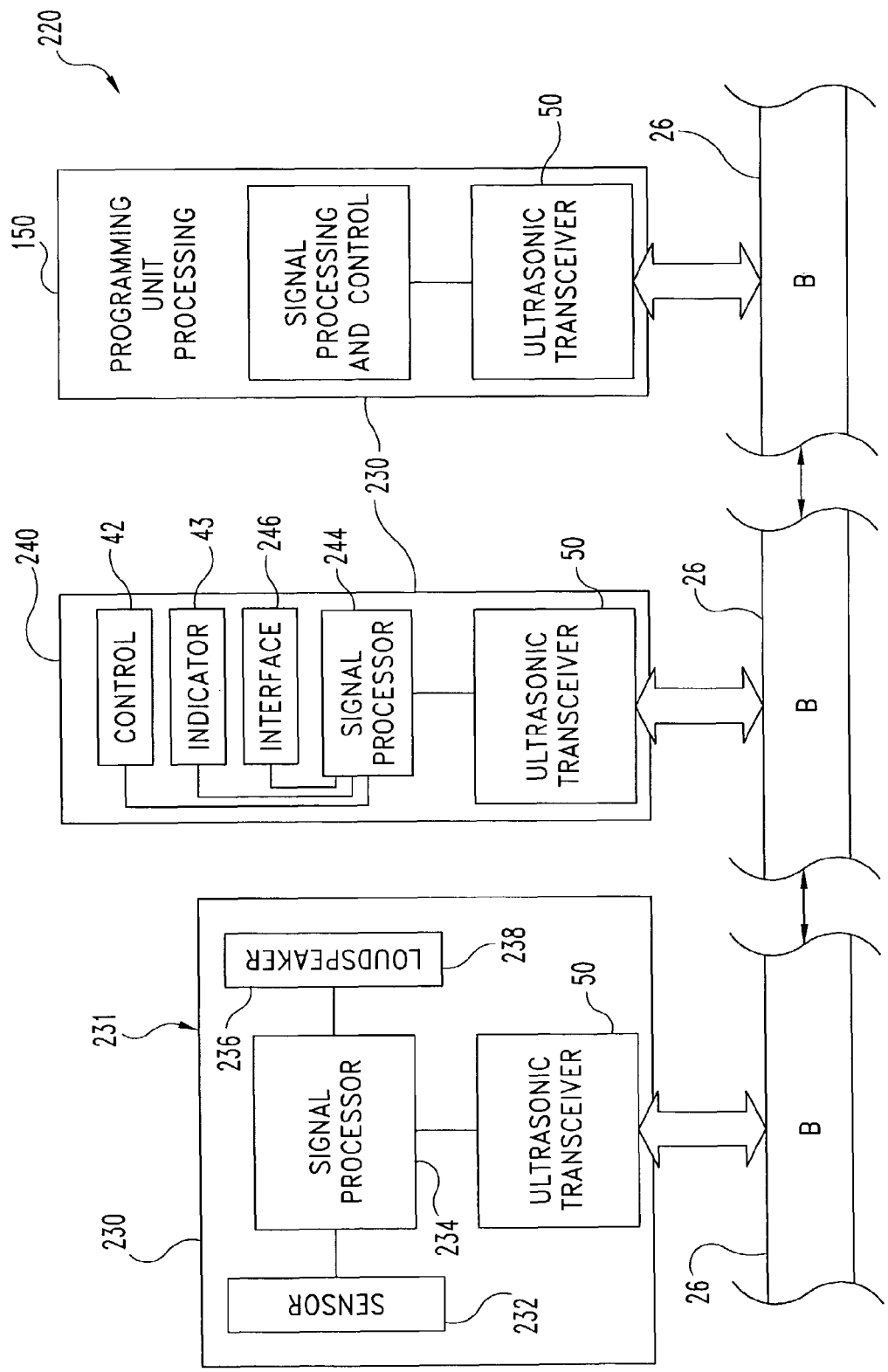
FIG. 9 is a schematic view of hearing system devices utilized in the system of FIG. 8.

FIGS. 8 and 9 illustrate intrabody communication system 220 of another embodiment of the present invention; where like reference numerals refer to like features. System 220 includes hearing system units 230. Hearing system units 230 are more specifically designated ear canal device 231, remote control and interface device 240, and programming device 150 (only shown in FIG. 9). Each of units 230 includes an ultrasonic transceiver 50 to provide bidirectional communication that utilizes at least a portion of body B as an ultrasonic signal communication link as previously described. Device 231 includes acoustic sensor 232. Sensor 232 can be a microphone or such other sound detecting sensor type as would occur to those skilled in the art. Sensor 232 is coupled to signal processor 234 which processes received signals to generate a corresponding output to hearing stimulator 236 in the form of ear canal loudspeaker 238. Processor 234 can be arranged to perform desired processing of signals received with sensor 232 and generate a corresponding hearing stimulus via stimulator 236 in a manner common to standard ITC devices.

Device 240, shown in the form of a body-worn wrist band 41 (see FIG. 8), can include user control 42 to control various operations and settings of device 231 and user viewable indicator 43 to display settings or other information for the user as described in connection with system 20. Device 240 further includes off-body interface 246 to provide for one-way or two-way communication of information with a remote device as described in connection with interface 45 and off-body device 90 of system 20. Control 42, indicator 43, and interface 246 are coupled to signal processor 244 which is responsive to suitable inputs and generates corresponding outputs for these components. Device 240 operates in a manner comparable to device 40 of system 20 to provide user control and information exchange relative to device 231. It should be understood that signal processing relative to sound detected with sensor 232 can be performed by processor 244 via ultrasonic communication in addition to or as an alternative to processing with processor 234. In other embodiments, device 240 can include one or more acoustic sensors in addition to or as an alternative to sensor 232 of device 231. Collectively, devices 231 and 240 can operate in a standard manner to enhance hearing of a user of system 220 with regard to acoustic inputs received via sensor 232 and/or audio inputs (if any) received via interface 246.

Device 150 (not shown in FIG. 8) is of the type described in connection with system 120, being operable to add to and/or modify programming of one or more of processors 234, 244. Correspondingly, device 150 of system 220 can be temporarily utilized as needed to change programming of one or more other units 230 or of a more permanent body-worn type. Alternatively or additionally, unit 150 can be combined with one or more other units 230 in other embodiments.

Figure 10:
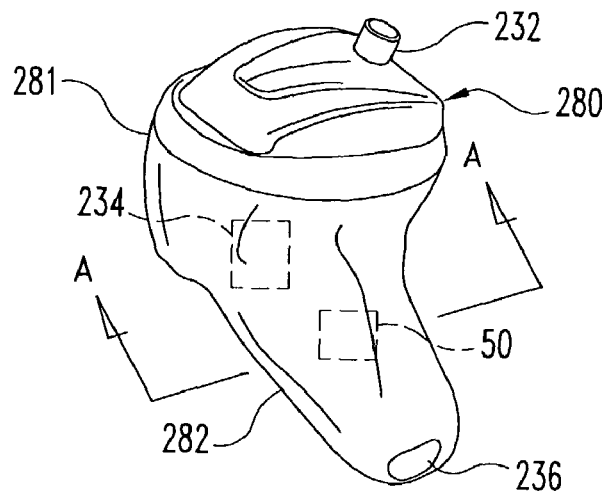
FIG. 10 is a view of an in-the-ear canal hearing system device.
Figure 11:
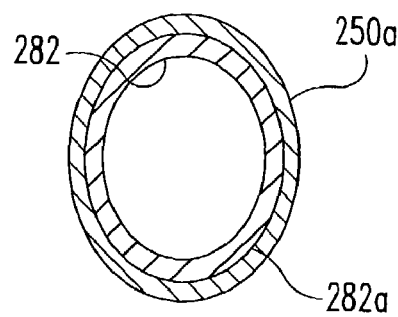
FIGS. 11-13 are alternative sectional views of the device shown in FIG. 10.
Figure 12:
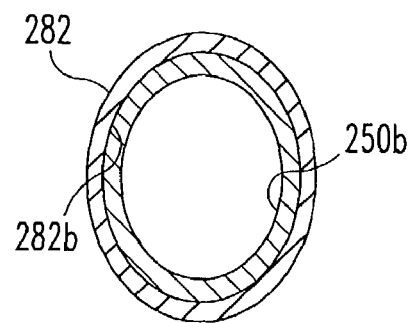
Figure 13:
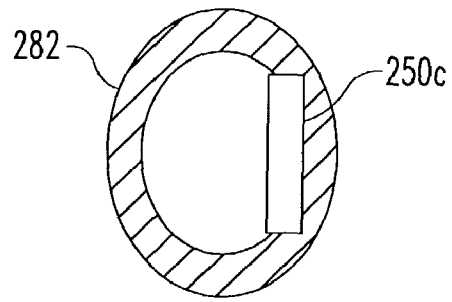

FIG. 10 illustrates a hearing system unit 280 in the form of an In-The-Canal (ITC) of the ear device 281. Device 281 includes case 282 enclosing operational components, such as those described in connection with device 231; where like reference numerals refer to like features. Referring to the sectional views of FIGS. 11-13, alternative ultrasonic arrangements are illustrated for a representative cross-section of device 281 along line A-A. In FIG. 11, a coating on the outer surface 282*a* of case 282 with an ultrasonic transduction material 250*a* defines, at least in part, the corresponding ultrasonic transducer 50. Material 250*a* can be of a piezoelectric or ferroelectric type or such different type as would occur to those skilled in the art. In FIG. 12, coating 250*b* on an inner surface 282*b* of case 282 with an appropriate ultrasonic transduction material, such as a piezoelectric or ferroelectric provides the corresponding ultrasonic transducer 50. In FIG. 13, a chip 250*c* of ultrasonic transduction material, such as a piezoelectric or ferroelectric, is mounted inside case 282 and is in acoustical contact with case 282 to provide the corresponding ultrasonic transducer 50. In other arrangements, two or more of these approaches could be combined, and/or one or more of these approaches could be used to provide a transducer for an external or internal hearing system unit or other intrabody communication device.

Figure 14:
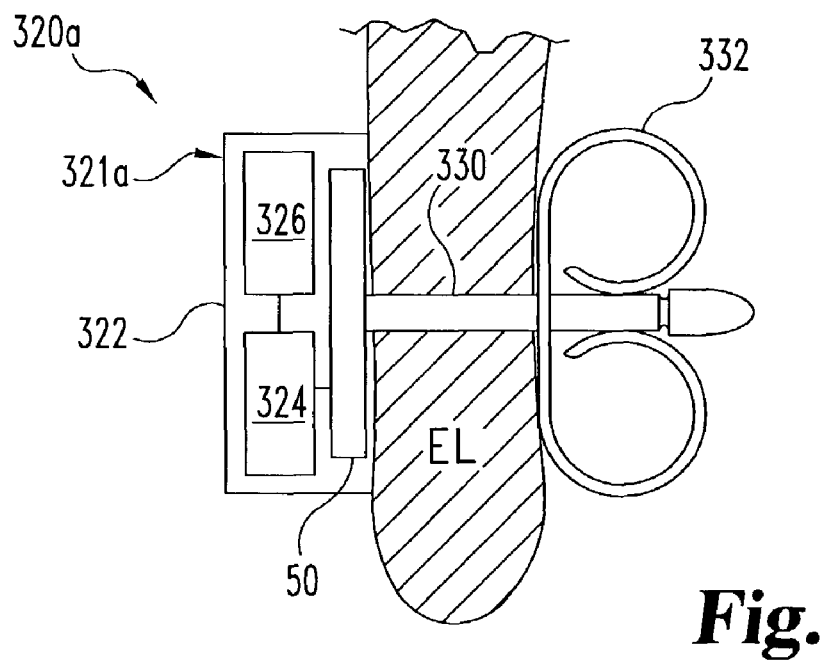
FIG. 14 is a partial diagrammatic view of a further type of hearing system device for intrabody communication.
Figure 15:
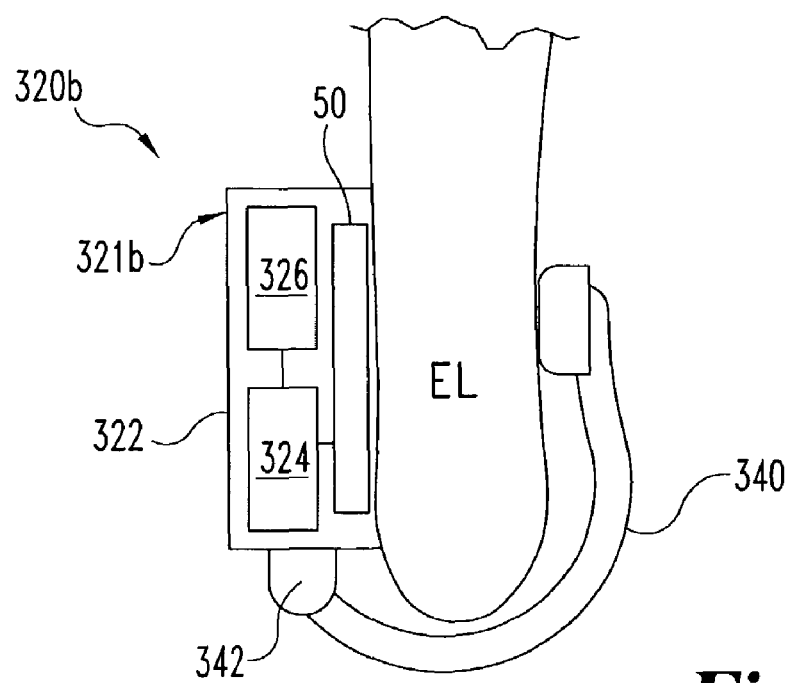
FIG. 15 is a partial diagrammatic view of another type of hearing system device for intrabody communication.

FIGS. 14 and 15 illustrate two different types of earlobe (EL) worn devices 320*a*, 320*b* each configured in the form of an earring 321*a*, 321*b*. Each device 320*a* and 320*b* includes an earring case 322 enclosing a signal processor and coupled microphones collectively designated by reference numeral 324, a power source in the form of battery 326, and an ultrasonic transceiver 50 coupled to the signal processor and microphones 324. For device 320*a*, case 322 is connected to post 330 which is configured to extend through an aperture (such as results from a piercing) of earlobe EL to be secured by a push-on fixation device 332 of the type commonly used with earrings. In FIG. 14, earlobe EL is shown in section to more clearly illustrate post 330. For device 320*b*, case 322 is coupled to clip 340 by spring 342 to provide a compressive grip around earlobe EL. Devices 320*a*, 320*b* can be utilized in place of a BTE type of device, or other type of external hearing system unit previously described. In one such alternative, an earring clip arrangement of device 320*b* is connected to earlobe EL to program a hearing system, having a cable connection to an off-body programmer. When the programming operation is complete, the earring clip is removed.

In still other embodiments, an earring is utilized to provide an external microphone for temporary or nominal use.

Figure 16:
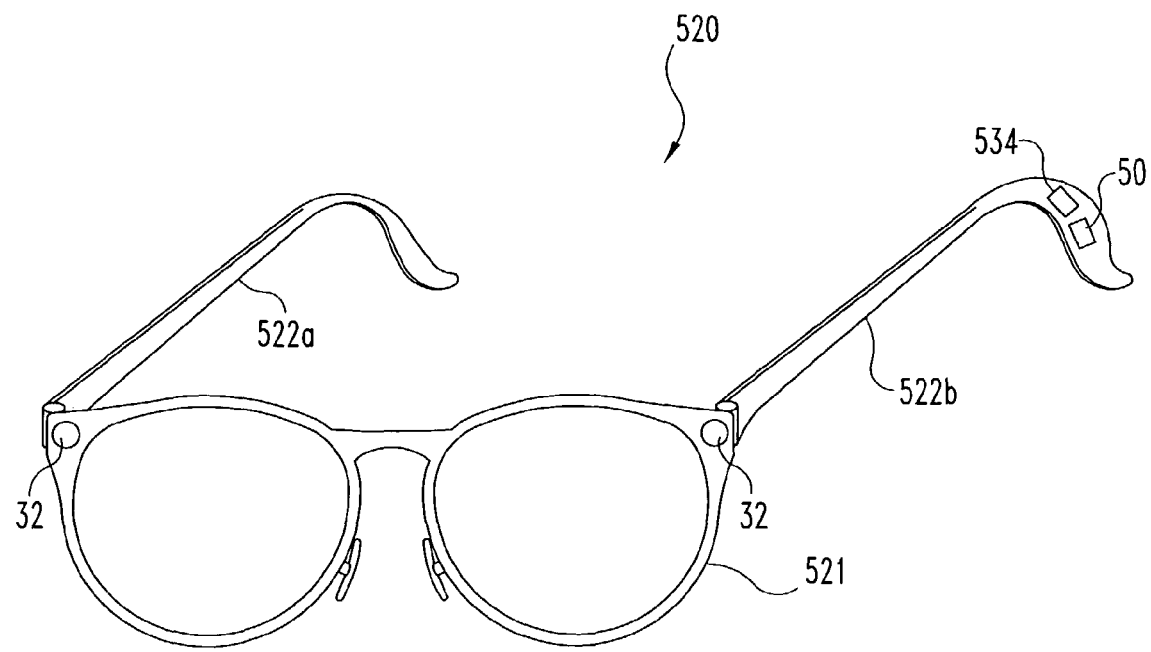
FIG. 16 is a partially diagrammatic, perspective view of still another type of hearing system device for intrabody communication.

Referring to FIG. 16, hearing system 520 includes eye glass frame 521. Frame 521 includes articulating earpieces 522*a*, 522*b*. System 520 also has sensors 32 positioned proximate to the temple hinges of frame 521. Ear piece 522*b* includes processor 534 operatively coupled to sensors 32, and ultrasonic transceiver 50 operatively coupled to processor 534 to collectively provide a hearing system device operationally comparable to the two devices 31 of system 20. A power source in the form of an electrochemical cell or battery or other type is also included (not shown). In other arrangements, different operations, and/or combinations of previously described embodiments could be incorporated into eye glass frame 521 using techniques known to those skilled in the art.

Figure 17:
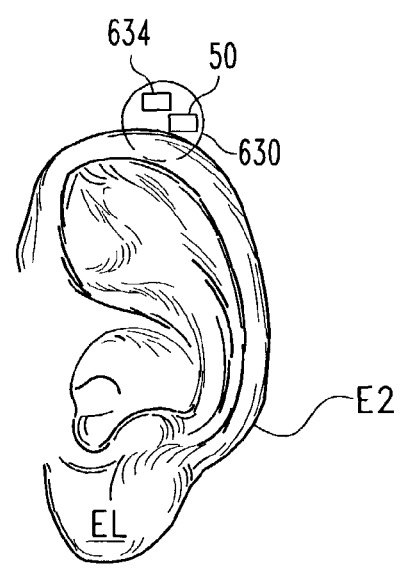
FIG. 17 is a partial diagrammatic view of yet another type of hearing system device for intrabody communication.

FIG. 17 illustrates ear E2 of body B having hearing system ear button 630 coupled behind ear E2. Ear button 630 can be held in place by an adhesive, a mechanical clip, a magnetic arrangement, and/or in a different manner as would occur to those skilled in the art. Ear button 630 can include a signal processor 634 and ultrasonic transceiver 50 of the type previously described. A power source in the form of an electrochemical cell or battery, or other type of power source is also included, but not shown to preserve clarity. Ear button 630 can be used to relay information unidirectionally or bidirectionally from other hearing system units and/or can include microphones to provide for communications with implanted devices. In one embodiment, ear button 630 can be used as a substitute for device 31, device 231, device 320*a*, device 320*b*, a combination of these, or such different hearing system unit configuration as would occur to those skilled in the art.

Figure 18:
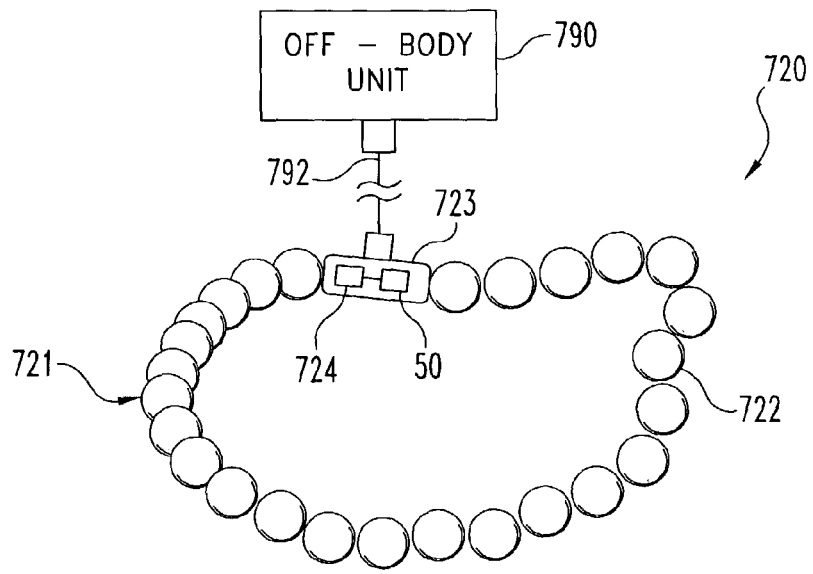
FIG. 18 is a partial diagrammatic view of a further hearing system device for intrabody communication.

Referring to FIG. 18, system 720 is illustrated in which intrabody communication device 721 is provided in the form of a bracelet 722 with case 723. Case 723 houses signal processor 724 and ultrasonic transceiver 50, which are coupled together. A power source in the form of an electrochemical cell or battery, or other type of power source is also enclosed, but is not shown to preserve clarity. Processing arrangement 724 further includes an off-body interface for communicating with off-body unit 790 via cable 792. Alternatively or additionally, processing arrangement 724 can be configured to include a wireless off-body communication arrangement. System 720 can be used to incorporate any of the external units previously described in connection with systems 20, 120, and/or 220.

Figure 19:
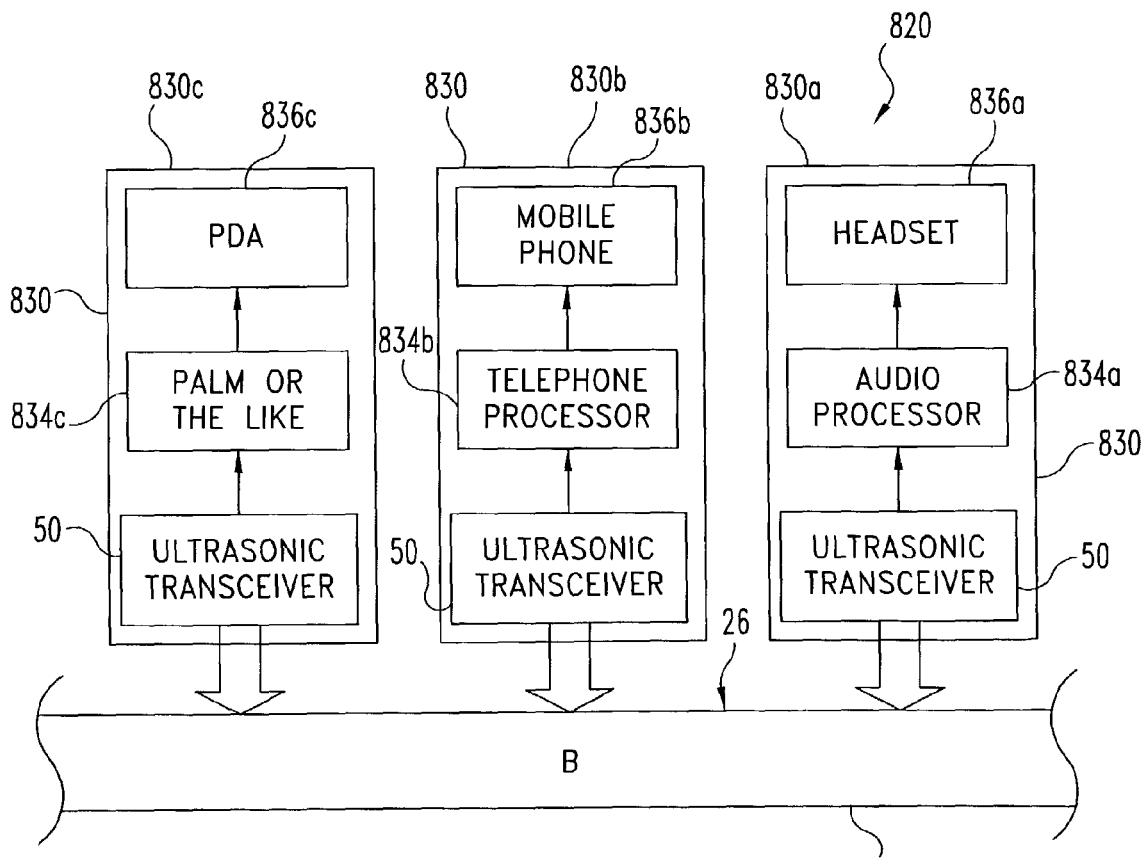
FIG. 19 is a schematic view of an intrabody communication system of a fourth type.

FIG. 19 illustrates intrabody communication system 820 including communication devices 830. System 820 establishes a Body Area Network (BAN) 821 using ultrasonic communication between devices 830. Typically, devices 830 are acoustically coupled to skin 26 of Body B. Communication devices 830 more specifically include headset unit 830*a*, mobile phone unit 830*b*, and Personal Digital Assistant (PDA) unit 830*c*. Units 830*a*, 830*b*, and 830*c* each include at least one ultrasonic transceiver 50 of the type previously described. Unit 830*a* further includes headset 836*a* coupled to audio processor 834*a* which is in turn coupled to the unit 830*a* ultrasonic transceiver 50 to selectively communicate with one or more devices 830. Headset 836*a* includes one or more earphone loudspeakers and optionally at least one microphone. Audio processor 834*a* and/or unit 830*a* can optionally include an MP3 player, tape player, CD player, and/or a wireless radio or television receiver, just to name a few possibilities.

Unit 830*b* includes mobile phone 836*b* coupled to telephone processor 834*b* arranged to selectively communicate through ultrasonic transceiver 50 of unit 830b. Such communication could be to device 830a to provide aural input to the user and, when microphones are included in headset 836a, to receive sound input therefrom.

Unit 830c includes PDA 836c having an interface to an ultrasonic transceiver 50 of unit 830c to connect to body area network 821. PDA 836c is coupled to transceiver 50 of device 830c via a PALM interface 834c or other appropriate arrangement. PDA 836c can communicate data to or from a remote source, such as the Internet or other computer network. Such computer network communication can be through wireless transmission with mobile phone 836b of unit 830b. In other embodiments, different devices could be used for intrabody communication based on bidirectional or unidirectional ultrasound transmission through BAN 821. Indeed, one or more of the units of system 820 could be used in conjunction with one or more of the hearing system units of previously described embodiments, and/or utilizing short range RF techniques, such as BLUETOOTH, AUTOCOM, MICROLINK or MLX.

Any processor or signal processing arrangement referenced herein can be of a software or firmware programmable type, a dedicated hardwired device, or a combination of both. Further, such processor or arrangements can be comprised of one or more components and can include one or more Central Processing Units (CPUs). In one embodiment, unit processing is based on a digitally programmable, highly integrated semiconductor chip particularly suited for signal processing. In other embodiments, a more general purpose type of device or arrangement could be utilized. Further, any processor or processing arrangement referenced herein can include one or more memory devices and/or types of memory such as solid-state electronic memory, magnetic memory, or optical memory. Also, signal processing arrangements include any oscillators, control clocks, interfaces, signal conditioners, format converters, filters, limiters, power supplies, communication ports, or other types of arrangements/circuitry as would occur to those skilled in the art to implement the present invention. Indeed, such arrangements could be integrated along with one or more signal processors on a dedicated microelectronic device directed to one or more embodiments of the present invention.

Many other embodiments of the present invention are contemplated. For example, in some instances, only unidirectional communication would be used with one or more, or perhaps all of the units being of a dedicated receiver or transmitter type. Correspondingly, circuitry of ultrasonic transceiver 50 can be simplified in accordance with the dedicated nature of the communication for such units, with programming of associated processors or processing arrangements being altered as appropriate to the dedicated transmitter or receiver arrangement. In still other embodiments, a hybrid combination of ultrasonic communication with one or more other forms of wireless communication, such as RF or IR based communication and/or cabled electric or optic based communication, could be utilized. Indeed, ultrasonic communication through the air could be used in conjunction with ultrasonic communication through at least a portion of a user's body with or without one or more of these other transmission formats. Power sources for any of the units can be of a disposable and/or rechargeable type—such as a rechargeable battery. Indeed, for implantable devices, rechargeable battery sources can be utilized which can be recharged remotely through a transcutaneous inductive power transfer technique.

In further embodiments, one or more features of one of the systems, units, or devices described in connection with FIGS. 1-19 can be combined, duplicated, deleted, or modified relative to one or more other of these systems, units, and/or devices. The techniques of the present invention can be used in a wide array of hearing system applications including Cochlear Implants (CI), Middle Ear Implants (MEI), and/or Bone Anchored Hearing Aids (BAHA), to name just a few representative examples. Further, intrabody communication systems of the present invention can be used in a wide variety of medical systems that can be facilitated by a BAN, as well as other nonmedical BAN applications. By way of nonlimiting example, nonmedical BAN applications include, but are not limited to security communication systems, entertainment systems, and surveillance systems, to name only a few. In one alternative embodiment, underwater applications could use hydrophone in place of a microphone. In still other embodiments, one or more intrabody communication system units are of an in-front-of-the-ear type. In other embodiments, an earring device, BTE device, ITC device, eye glass frame device, bracelet device or the like is cabled to another device. Alternatively or additionally, one or more external microphones are cabled to such a device. Indeed, in one alternative embodiment a microphone close to one side of the user's head communicates ultrasonically through the user's head, at least partially by soft tissue conduction, to an implanted device close to the other side of the user's head and/or to an external device mounted on the other side of the user's head.

As used herein, communications via a cable connection to an interface can be through any standard protocol, including, but not limited to USB, RS232, RS422, etc. Likewise, wireless communications can be via any standard protocol appropriate to the medium and frequency range.

In another arrangement, one or more devices could be of a type that derives some or all of its power from other devices and/or parasitically from the user. For example, the movement of the user could be used to generate small amounts of usable power. Devices suitable for operation without an independent power source particularly include those that communicate with remote devices where power could be remotely supplied via the communication interface wirelessly (i.e. inductively) and/or through cabling. Communicating certain RF tag devices are nonlimiting examples of this kind of arrangement. In still other embodiments, a different power source and/or power supply source could be utilized as would occur to those skilled in the art.

A further embodiment of the present invention includes a bi-directional transcutaneous communication system for bi-directional point-to-point communication between at least two electronic system units placed on the body of a user, wherein each of the electronic system units incorporates an ultrasonic transmitter and an ultrasonic receiver, wherein the ultrasonic transmitters each include an ultrasonic transducer for converting electrical transmitter signals into information-containing ultrasonic signals, and wherein the ultrasonic receivers each include an ultrasonic transducer for converting information-containing ultrasonic signals into electrical receiver signals, the ultrasonic transducers, at least when in operation, being disposed in at least close proximity to the skin of the user for transmitting and receiving, respectively, ultrasonic signals utilizing the body of the user as an ultrasonic transmission line between the electronic system units. In one form, the communication system is directed to aiding hearing of a hearing impaired user. In another form, the communication system is utilized for entertainment and/or telephonic communication.

Still a further embodiment comprises a bi-directional transcutaneous communication system for bi-directional point-to-point communication between at least two electronic system units placed on the body of a user, wherein each of the electronic system units incorporates an ultrasonic transceiver, the transceiver including an ultrasonic transducer for converting, in a time sharing mode, electrical transmitter signals into information-containing ultrasonic signals and information-containing ultrasonic signals into electrical receiver signals, the ultrasonic transducer, at least when in operation, being disposed in at least close proximity to the skin of the user for transmitting and receiving, respectively, ultrasonic signals utilizing the body of the user as an ultrasonic transmission line between the electronic system units. In one form, the communication system is directed to aiding hearing of a hearing impaired user. In another form, the communication system is utilized for entertainment and/or telephonic communication.

Yet a further embodiment includes a partially implantable hearing system comprising an external module and an implantable module, wherein the external module includes microphone means for picking up acoustic signals, wherein the implantable module includes an output actuator arrangement for stimulation of the hearing in response to picked up acoustic signals, wherein the hearing system further comprises a transcutaneous ultrasonic communication link for ultrasonic communication between the external and implantable modules, wherein the external module incorporates means for at least transmitting ultrasonic signals containing information related to picked up acoustic signals and the implantable module incorporates means for at least receiving ultrasonic signals containing information related to picked up acoustic signals, wherein the transmitting and receiving means each include ultrasonic transducer means for converting electrical transmitter signals into information-containing ultrasonic signals and for converting information-containing ultrasonic signals into electrical receiver signals, respectively, the ultrasonic transducer means being disposed in at least close proximity to the skin of the user for transmitting and receiving, respectively, the ultrasonic signals utilizing the body of the user as an ultrasonic transmission line between the external and implantable modules.

In another embodiment, a partially implantable hearing system comprises an external module and an implantable module, wherein the external module includes microphone means for picking up acoustic signals, wherein the implantable module includes an output actuator arrangement for stimulation of the hearing in response to picked up acoustic signals, wherein the hearing system further comprises a transcutaneous ultrasonic communication link for ultrasonic communication between the external and implantable modules via modulated ultrasonic carrier signals having a frequency in the range between 100 kHz and 10 MHz, wherein the external module incorporates means for at least transmitting modulated ultrasonic carrier signals and the implantable module incorporates means for at least receiving modulated ultrasonic carrier signals, wherein the transmitting and receiving means each include ultrasonic transducer means for converting electrical transmitter signals into modulated ultrasonic carrier signals and for converting modulated ultrasonic carrier signals into electrical receiver signals, respectively, the ultrasonic transducer means being disposed in at least close proximity to the skin of the user for transmitting and receiving, respectively, ultrasonic signals utilizing the body of the user as an ultrasonic transmission line between the external and implantable modules. In a further embodiment, the frequency range is from about 500 kHz through about 2 MHz.

For still another embodiment, a hearing system comprises an implantable module that can be totally implanted, the implantable module including microphone means for picking up acoustic signals, audio signal processing means, and an output actuator arrangement for stimulation of the hearing in response to picked up acoustic signals, wherein the hearing system further comprises at least one external module selected from the group consisting of programming units, remote control units, external microphones, and signal processing and control units and any combinations thereof, and a transcutaneous ultrasonic communication link for ultrasonic communication between the external and implantable modules, wherein the external module incorporates means for at least transmitting information-containing ultrasonic signals and the implantable module incorporates means for at least receiving information-containing signals, wherein the transmitting and receiving means each include ultrasonic transducer means for converting electrical transmitter signals into information-containing ultrasonic signals and for converting information-containing ultrasonic signals into electrical receiver signals, respectively, the ultrasonic transducer means being disposed in at least close proximity to the skin of the user for transmitting and receiving, respectively, ultrasonic signals utilizing the body of the user as an ultrasonic transmission line between the external and implantable modules.

For a further embodiment, a hearing system comprises an implantable module that can be totally implanted, the implantable module including microphone means for picking up acoustic signals, audio signal processing means, and an output actuator arrangement for stimulation of the hearing in response to picked up acoustic signals, wherein the hearing system further comprises at least one external module selected from the group consisting of programming units, remote control units, external microphones, and signal processing and control units and any combinations thereof, and a transcutaneous ultrasonic communication link for ultrasonic communication between the external and implantable modules via modulated ultrasonic carrier signals having a frequency in the range between 100 kHz and 10 MHz, wherein the external module incorporates means for at least transmitting modulated ultrasonic carrier signals and the implantable module incorporates means for at least receiving modulated ultrasonic carrier signals, wherein the transmitting and receiving means each include ultrasonic transducer means for converting electrical transmitter signals into modulated ultrasonic carrier signals and for converting modulated ultrasonic carrier signals into electrical receiver signals, respectively, the ultrasonic transducer means being disposed in at least close proximity to the skin of the user for transmitting and receiving, respectively, ultrasonic signals utilizing the body of the user as an ultrasonic transmission line between the external and implantable modules. In another embodiment, the frequency range is from about 500 kHz through about 2 MHz.

All publications, patents, and patent applications cited in this specification are herein incorporated by reference as if each individual publication, patent, or patent application were specifically and individually indicated to be incorporated by reference and set forth in its entirety herein. Further, any theory, mechanism of operation, proof, or finding stated herein is meant to further enhance understanding of the present invention and is not intended to make the present invention in any way dependent upon such theory, mechanism of operation, proof, or finding. While the invention has been illustrated and described in detail in the drawings and foregoing description, the same is to be considered as illustrative and not restrictive in character, it being understood that only selected embodiments have been shown and described and that all changes, modifications and equivalents that come within the spirit of the invention as defined herein and/or by the following claims are desired to be protected.

What is claimed is:

1. A method, comprising:
   providing a hearing system including a first device spaced apart form a second device;
   coupling the first device and the second device to user's body, at least one of the first device and the second device being acoustically coupled to skin of the user's body; and
   performing two-way communication between the first device and the second device through bidirectional transmission of ultrasound signals through at least a portion of the user's body between the first device and the second device.

2. The method of claim 1, which includes acoustically coupling both the first device and the second device to the skin of the use's body.

3. The method of claim 1, wherein at least one of the first device and the second device includes one or more microphones.

4. The method of claim 1, wherein the hearing system includes a plurality of microphones and which includes performing adaptive beamforming with the hearing system.

5. The method of claim 1, wherein said two-way communication includes transmitting and receiving the ultrasound signals with a modulated ultrasonic carrier frequency in a range between 100 kHz and 10 MHz.

6. The method of claim 1, which includes performing digital signal processing with a digital signal processor included in one or more of the first device and the second device.

7. The method of claim 1, which includes stimulating hearing with a stimulation apparatus including in at least one of the first device and the second device.

8. The method of claim 7, wherein the stimulation apparatus includes at least one of a middle ear actuator, an electromechanical intracochlear actuator, a bone conduction cochlea stimulator, and an intracochlear electrode array.

* * * * *

UNITED STATES PATENT AND TRADEMARK OFFICE
CERTIFICATE OF CORRECTION

| | | |
|---|---|---|
| PATENT NO. | : 7,945,064 B2 | Page 1 of 1 |
| APPLICATION NO. | : 10/409970 | |
| DATED | : May 17, 2011 | |
| INVENTOR(S) | : William D. O'Brien, Jr. et al. | |

It is certified that error appears in the above-identified patent and that said Letters Patent is hereby corrected as shown below:

Col. 17, Line 18: Replace "use's" with --user's--.
Col. 18, Line 12: Replace "including" with --included--.

Signed and Sealed this
Second Day of August, 2011

David J. Kappos
*Director of the United States Patent and Trademark Office*